US012214477B2

(12) United States Patent
Moloznik

(10) Patent No.: US 12,214,477 B2
(45) Date of Patent: Feb. 4, 2025

(54) FASTENING TOOL HAVING A DRY FIRE LOCKOUT ASSEMBLY

(71) Applicant: Black & Decker, Inc., New Britain, CT (US)

(72) Inventor: Luke Moloznik, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 111 days.

(21) Appl. No.: 17/837,316

(22) Filed: Jun. 10, 2022

(65) Prior Publication Data

US 2022/0297276 A1 Sep. 22, 2022

Related U.S. Application Data

(63) Continuation of application No. PCT/US2020/064319, filed on Dec. 10, 2020.

(60) Provisional application No. 62/946,190, filed on Dec. 10, 2019, provisional application No. 62/946,238, filed on Dec. 10, 2019.

(51) Int. Cl.

*B25C 1/00* (2006.01)
*B25C 1/04* (2006.01)
*B25C 1/06* (2006.01)

(52) U.S. Cl.

CPC .............. *B25C 1/008* (2013.01); *B25C 1/005* (2013.01); *B25C 1/047* (2013.01); *B25C 1/06* (2013.01)

(58) Field of Classification Search

CPC ......... B25C 1/008; B25C 1/005; B25C 1/047; B25C 1/06

USPC .............................................................. 227/1

See application file for complete search history.

(56) References Cited

U.S. PATENT DOCUMENTS 5,794,831 A * 8/1998 Velan ...................... B25C 1/001 227/9
2010/0294824 A1* 11/2010 Takemura ................. B25C 1/04 227/3

* cited by examiner

*Primary Examiner* — Jacob A Smith
(74) *Attorney, Agent, or Firm* — Rhonda Barton

(57) ABSTRACT

A fastening tool having a dry fire lockout assembly connected to and operatively engaged with a magazine assembly that prevents the tool from driving a fastener with there is less than a predetermined number of fasteners in the magazine assembly and an indicator that notifies the user that there is less than a predetermined number of fasteners in the magazine assembly.

33 Claims, 9 Drawing Sheets

FASTENING TOOL HAVING A DRY FIRE LOCKOUT ASSEMBLY

CROSS-REFERENCE TO RELATED APPLICATIONS

The present application is a continuation of international application PCT/US2020/064319, filed Dec. 10, 2020, which claims priority under 35 U.S.C. § 119 to U.S. Provisional Application Ser. No. 62/946,190 entitled "Fastener Tool Having a Dry Fire Lockout Assembly", filed Dec. 10, 2019, and U.S. Provisional Patent Application Ser. No. 62/946,238 entitled "Fastening Tool Having a Dry Fire Lockout Assembly and Indicator", filed Dec. 10, 2019. The entirety of the above applications is incorporated herein by reference.

BACKGROUND OF THE INVENTION

Field of the Invention

The present invention relates, in general, to the field of power tools. In particular, the present invention relates to a fastening or driving tool, such as a nailer and more particularly to improvements in such tools for preventing the dry firing of the tool. In particular, the present invention relates to a fastening tool having a dry fire lockout assembly that prevents the firing of the tool when there is less than a predetermined number of fasteners remaining in the tool.

Description of the Related Art

Different types of fastening tools are known including portable pneumatically actuated devices, electrically actuated devices, hammer actuated devices, manual actuated devices, etc. Fastening tools, such as power nailers have become relatively common place in the construction industry. Battery-powered nailers are popular in the market.

A common characteristic of all these types of fastening tools is the provision of a drive track, a fastener driving element mounted in the drive track and a magazine assembly for receiving a supply of fasteners in stick formation and feeding successive leading fasteners in the stick laterally into the drive track to be driven outwardly thereof by the fastener driving element. During fastening users are often unaware that the magazine has been depleted of fasteners and continue to try to drive fasteners into a workpiece by pressing the trigger. This is known as a dry fire situation. A dry fire situation causes the tool to recoil from the force of the nosepiece against the workpiece. As a result, the nosepiece can leave an indentation on the workpiece. If the workpiece is a wood material, the word can be damaged.

Accordingly, there is a need in the art for a nailer that is capable of reliably preventing the firing of the nailer when there are no fasteners in the magazine.

SUMMARY OF THE INVENTION

In an embodiment, a fastening tool includes a housing and a nosepiece assembly connected to the housing and including a fastener drive track having a drive axis. A magazine assembly includes a magazine pusher slidably disposed in the magazine assembly for feeding a number of fasteners successively along a fastener channel to the fastener drive track of the nosepiece assembly. A driver member is provided in the housing and configured for movement along the drive axis to drive a lead fastener into a workpiece. A motor is disposed within the housing and configured to drive the driver member along the drive axis. A power source provides power to the motor and a controller is configured to control a supply of power from the power source to the motor and initiate a drive sequence. A dry fire lockout assembly includes a lever having a first end and a second end opposite to the first end, the lever configured to pivot in response to a change in force applied to the first end thereof, a sensor target disposed on the second end of the lever and has at least one characteristic that changes in response to the change in force, and a sensor configured to sense the at least one characteristic of the sensor target and send a signal to the controller in response to the at least one characteristic. When the controller receives the signal from the sensor, the controller inhibits the drive sequence.

In an embodiment, a fastening tool includes a housing and a nosepiece assembly connected to the housing and including a fastener drive track having a drive axis. A magazine assembly includes at least one magazine pusher slidably disposed in the magazine assembly for feeding a number of fasteners successively along a fastener channel to the fastener drive track of the nosepiece assembly. A driver member is provided in the housing and configured for movement along the drive axis to drive a lead fastener into a workpiece. A motor is disposed within the housing and configured to drive the driver member along the drive axis. A power source provides power to the motor and a controller is configured to control a supply of power from the power source to the motor and initiate a drive sequence. A dry fire lockout assembly includes a lever housing mounted to the magazine assembly. A lockout lever is pivotably mounted on the lever housing and having a first end configured to enter the fastener channel when there is less than a predetermined number of fasteners in the magazine assembly and a second end that moves in a direction opposite to the first end. A magnet is disposed on the second end of the lever and having at least one of a magnetic orientation and a magnetic flux that corresponds to a state of the magazine assembly having less than a predetermined number of fasteners. A Hall effect sensor is configured to sense at least one of the magnetic orientation and the magnetic flux of the magnet and send a signal to the controller in response to the magnetic orientation or the magnetic flux. When the controller receives the signal from the Hall effect sensor that indicates that there is less than a predetermined number of fasteners, the controller inhibits the drive sequence.

In an embodiment, a fastening tool includes a housing and a nosepiece assembly connected to the housing and including a fastener drive track having a drive axis. A magazine assembly includes a magazine pusher slidably disposed in the magazine assembly for feeding a number of fasteners successively along a fastener channel to the fastener drive track of the nosepiece assembly. A driver member is provided in the housing and configured for movement along the drive axis to drive a lead fastener into a workpiece. A motor is disposed within the housing and configured to drive the driver member along the drive axis. A power source provides power to the motor and a controller is configured to control a supply of power from the power source to the motor and initiate a drive sequence. A dry fire lockout assembly includes a lever having a first end and a second end opposite to the first end, the lever configured to pivot in response to a change in force applied to the first end thereof. A sensor target is disposed on the second end of the lever and has a characteristic that changes in response to the change in force. A sensor is configured to sense the characteristic of the sensor target and send a signal to the controller in response to the characteristic. An indicator is operatively connected to the controller to receive an activation signal therefrom. When the controller receives the signal from the sensor, the controller inhibits the drive sequence and initiates activation of the indicator.

A fastening tool includes a housing and a nosepiece assembly connected to the housing and including a fastener drive track having a drive axis. A magazine assembly including a magazine pusher slidably disposed in the magazine assembly for feeding a number of fasteners successively along a fastener channel to the fastener drive track of the nosepiece assembly. A driver member is provided in the housing and configured for movement along the drive axis to drive a lead fastener into a workpiece. A motor is disposed within the housing and configured to drive the driver member along the drive axis. A power source provides power to the motor and a controller is configured to control a supply of power from the power source to the motor and initiate a drive sequence. A dry fire lockout assembly includes a lever having a first end and a second end opposite to the first end, the first end of the lever disposed in the fastener channel when there is less than a predetermined number of fasteners in the magazine assembly. A sensor target is disposed on the second end of the lever. A sensor is configured to sense a characteristic of the sensor target that indicates that there is less than a predetermined number of fasteners in the magazine assembly and to send an output signal to the controller in response to the characteristic. At least one visual indicator is operatively connected to the controller to receive an indicator activation signal therefrom. When the controller receives the output signal from the sensor, the controller inhibits the drive sequence. The at least one visual indicator is activated by the controller when the sensor detects the characteristic of the sensor target that corresponds to a state of the magazine assembly having less than a predetermined number of fasteners.

In an embodiment, a lockout assembly in a fastening tool having a magazine assembly including at least one magazine pusher slidably disposed in the magazine assembly for feeding a number of fasteners successively along a fastener channel, a power source, and a controller configured to control a supply of power and initiate a drive sequence, is provided. The lockout assembly includes a pivotable lever engageable with the fastener channel and having a first end configured to enter the fastener channel when there is less than a predetermined number of fasteners in the magazine assembly and a second end that moves in a direction opposite to the first end. A magnet is disposed on the second end of the pivotable lever and has at least one of a magnetic orientation and a magnetic flux that corresponds to a state of the magazine assembly having less than a predetermined number of fasteners. A Hall effect sensor is configured to sense at least one of the magnetic orientation and the magnetic flux of the magnet and to send a signal to the controller in response to the magnetic orientation or the magnetic flux. When the controller receives the signal from the Hall effect sensor that indicates that there is less than a predetermined number of fasteners, the controller inhibits the drive sequence.

Additional features and benefits of the present invention are described, and will be apparent from, the accompanying drawings and the detailed description below.

BRIEF DESCRIPTION OF THE DRAWINGS

The numerous advantages of the present invention may be better understood by those skilled in the art by reference to the accompanying Figures. In the drawings, like reference numerals designate corresponding parts throughout the several views.

Corresponding reference numerals indicate corresponding parts throughout the several views of the drawings.

DETAILED DESCRIPTION OF THE INVENTION

Figure 1:
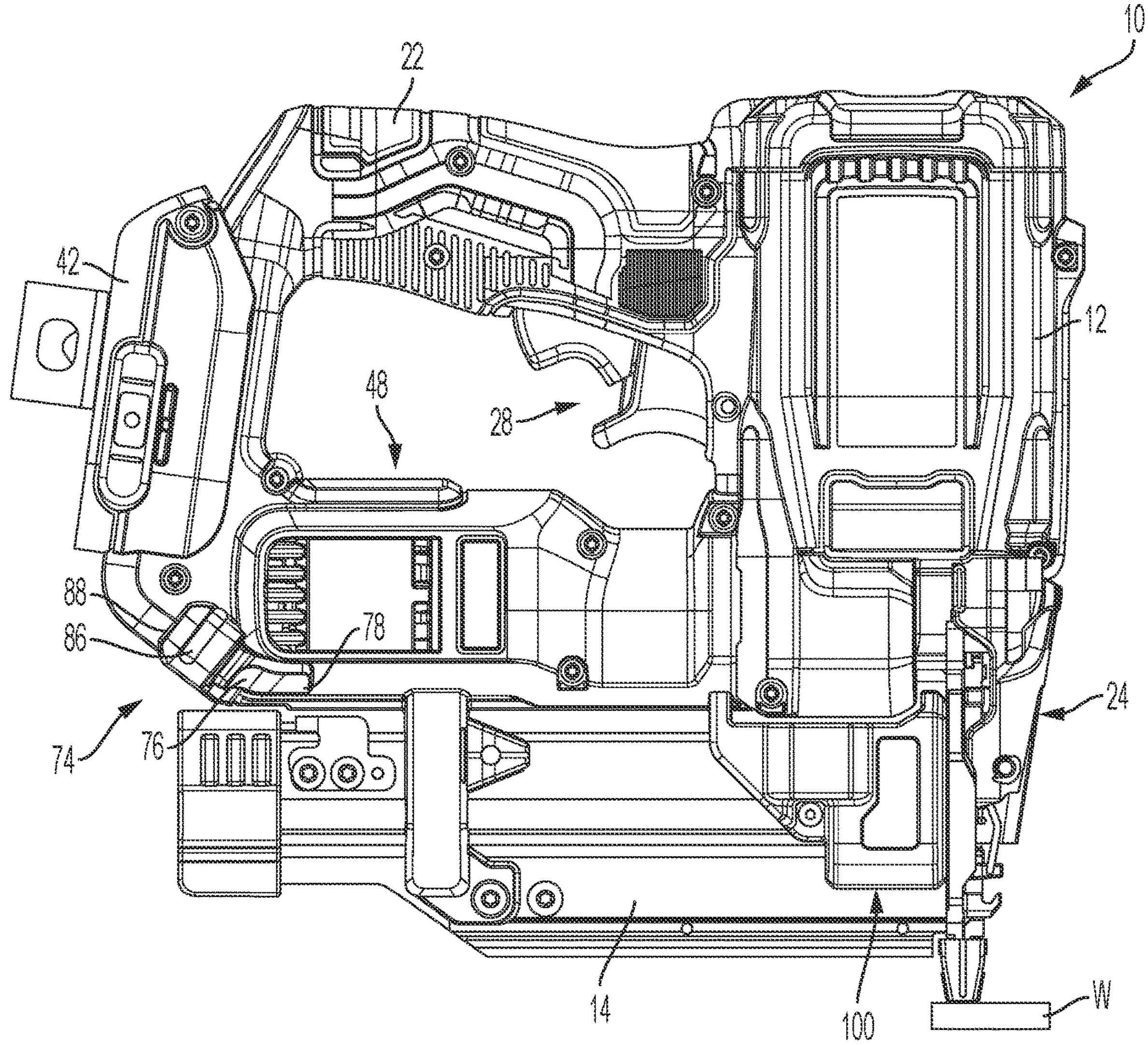
FIG. 1 is a side view of an exemplary fastening tool constructed in accordance with the teachings of the present disclosure.
Figure 2:
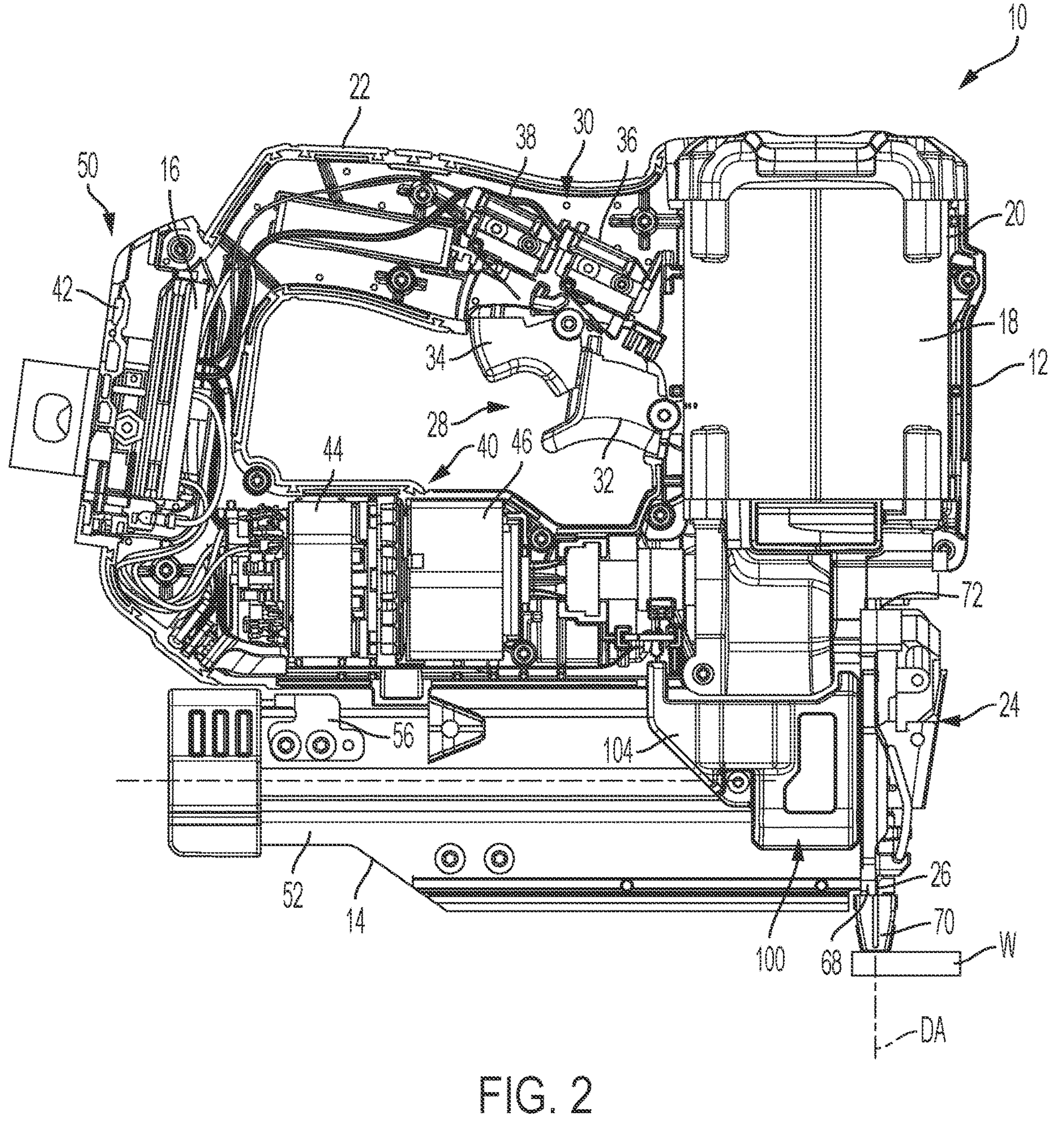
FIG. 2 is a side view of an exemplary fastening tool of FIG. 1 with the housing removed.

FIGS. 1 and 2 illustrate a fastening tool 10 according to an embodiment of the invention.

According to several aspects, the fastening tool 10 is a battery powered nailer, however the fastening tool can be any type of portable tool including a pneumatic nailer. The fastening tool 10 includes a housing 12, a nosepiece assembly 24 extending forward of and fixed to the housing 12, a control module or controller 16, a dry fire lockout assembly 100 and dry fire lockout indicator 84, and a magazine assembly 14 connected to a nose portion 68 of the nosepiece assembly. The nosepiece assembly 24 defines a fastener drive track 26 through which fasteners F, such as nails, are driven. The fastening tool 10 is designed to drive a fastener F into a workpiece W.

As illustrated in FIG. 2, the housing 12 includes a compression cylinder 18 in which a gas, such as air is compressed. In particular, the compression cylinder 18 contains a compression chamber 20 that is configured to receive a pressurized gas that is used to drive a driver member 72 having a driver blade (not shown) in the nosepiece assembly 24 that impacts the fastener F and drives the fastener into the workpiece. The compression chamber 20 is substantially defined within the compression cylinder 18. The compression chamber 20 is configured to drive the fastener along a drive axis DA out of the fastener drive track 26 and into the workpiece W.

A handle portion 22 of the tool extends from the housing 12. The handle 22 is configured to be received by a user's hand, thereby making the fastening tool 10 portable. Additional portability can be achieved by constructing the housing 12 from a lightweight yet durable material, such as magnesium.

The trigger assembly 28 is pivotably connected to the handle 22. The trigger assembly 28 serves as an actuation device or actuator for the fastening tool 10, and is constructed and arranged to actuate a switch assembly 30. The trigger assembly 28 may be coupled to the housing 12 and is configured to receive an input from the user, typically by way of the user's finger, that may be employed in conjunction with the trigger switch assembly 30 to generate a trigger signal that may be employed in part to initiate the drive sequence of the fastening tool 10 to drive the fastener F into the workpiece W.

The trigger assembly 28 includes a primary trigger 32 and a secondary trigger 34. The switch assembly 30 includes a primary switch 36 actuated by the primary trigger 32 and a secondary switch 38 is actuated by the secondary trigger 34. The primary and secondary triggers 32, 34 are pivotably mounted to the handle 22 so as to be grasped by the user's finger(s).

In operation, the secondary trigger 34 is pulled first to activate the secondary switch 38 which powers the fastening tool. Powering of the fastening tool includes the activation of any lights and sensors for checking for fasteners in the magazine assembly 14. After the secondary trigger 34 is pulled, the primary trigger 32 is pulled to activate the primary switch 36. The primary switch 36 activates the drive assembly 40. The primary and secondary switches 36, 38 may be disposed within the handle portion 22 of the fastening tool 10.

A transmission portion 48 of the tool extends from the housing 12 and includes additional components necessary for activating the tool and driving a fastener. In an embodiment, the transmission portion 48 may extend substantially perpendicularly from the housing 12. The transmission portion 48 includes a drive motor assembly 40.

The drive motor assembly 40 may be actuated by the control module or controller 16 to cause the driver member 72 to translate and impact a fastener F in the nosepiece assembly 24 so that the fastener may be driven into the workpiece W. The drive assembly 40 includes a motor 44 and a transmission gear system 46. The drive assembly 40 is enclosed in a drive assembly or transmission housing 48 disposed between a power source 50 and the nosepiece assembly 24. Actuation of the power source 50 may use electrical energy from a battery pack 42 to operate the motor 44 of the drive motor assembly 40 and the trigger assembly 28. The controller 16 is configured to control a supply of power from the power source 50 to the motor 44 to initiate and activate the drive sequence upon receipt of the trigger signal.

Fasteners F are temporarily contained in the magazine assembly 14, which can be connected to the nosepiece assembly 24. The magazine assembly 14 includes a fixed magazine portion 52 and a movable magazine portion 54 slidably disposed on the fixed magazine portion. The fixed 52 and movable 54 magazine portions are held together by a magazine latch 56. The magazine assembly 14 is constructed and arranged to feed successive leading fasteners from a supply of fasteners inserted between the fixed and movable magazine portions 52, 54 along a feed track or fastener channel 64 and into the drive track 26. In an embodiment, the supply of fasteners F can be collated fasteners. The supply of fasteners F is urged toward the drive track 26 by at least one magazine pusher or plurality of pushers 60 that are slidably disposed in grooves 62 in the magazine assembly 14. The magazine pusher or pushers 60 travels along a magazine pusher path or fastener channel 64. The magazine pusher or pushers 60 is biased towards the drive track 26 by a spring or plurality of springs (not shown) that push respective pushers 60 toward the drive track 26. The magazine pusher or pushers 60 engages the last fastener in the supply of fasteners to thereby feed individual fasteners from the magazine assembly 14 to the nosepiece assembly 24. When the last fastener in the supply of fasteners has been driven or less than a predetermined number of fasteners remain in the magazine assembly 14, a dry fire lockout assembly is activated.

Figure 3B:
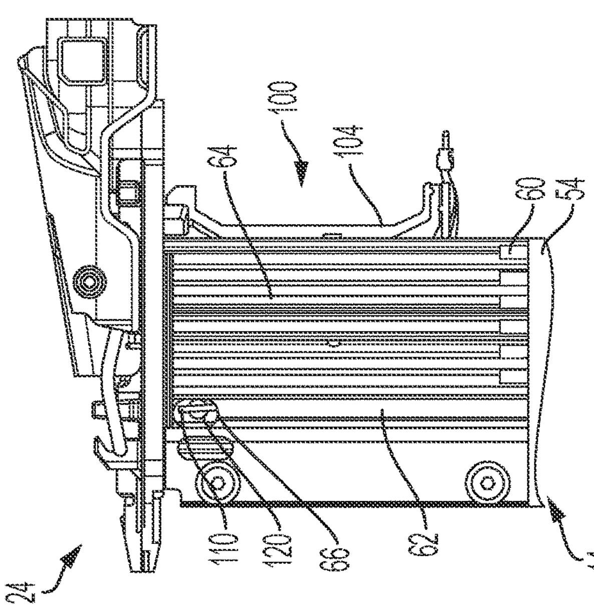
FIGS. 3A and 3B illustrate the exemplary fastening tool of FIG. 1 with the dry fire lockout assembly affixed to a side of the magazine and FIG. 3C illustrates the exemplary fastening tool of FIG. 1 with the dry fire lockout assembly and a portion of the magazine removed.

The dry fire lockout assembly 100 as illustrated in FIGS. 3A, 3B, 3C, 4 and 5, is mounted to the fixed magazine 52 on one side thereof. A portion of the assembly protrudes through slot 66 in the fixed magazine out to the opposite side thereof, as shown in FIG. 3B, to indicate that less than a predetermined number of fasteners is in the magazine assembly. The slot 66 passes through the fastener channel 64. Although the illustrated magazine assembly 14 is configured to receive fasteners that are collated in a stick configuration, it is also contemplated that a magazine assembly that is configured to accommodate fasteners that are collated in a coil formation may also be used. The illustrated embodiment is not intended to be limiting in any way.

In an embodiment, the dry fire lockout assembly 100 can initiate a lockout state of the fastening tool 10 when no fasteners, a predetermined lockout number of fasteners or less than a predetermined number of fasteners are present in the magazine assembly 14. Less than a predetermined number of fasteners includes zero (0) fasteners. In such a dry fire lockout assembly, the tool is prevented from driving a fastener. This lockout state can make the user aware that a fastener is not going to be driven and that it is appropriate to reload fasteners or to add more fasteners into the magazine assembly 14.

Figure 3C:
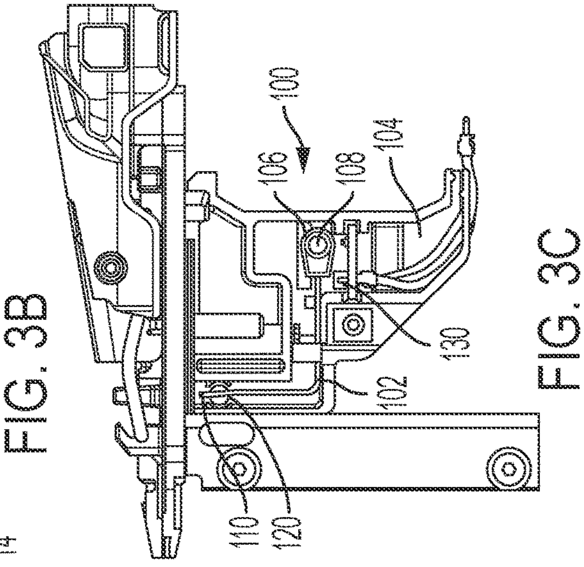
Figure 3A:
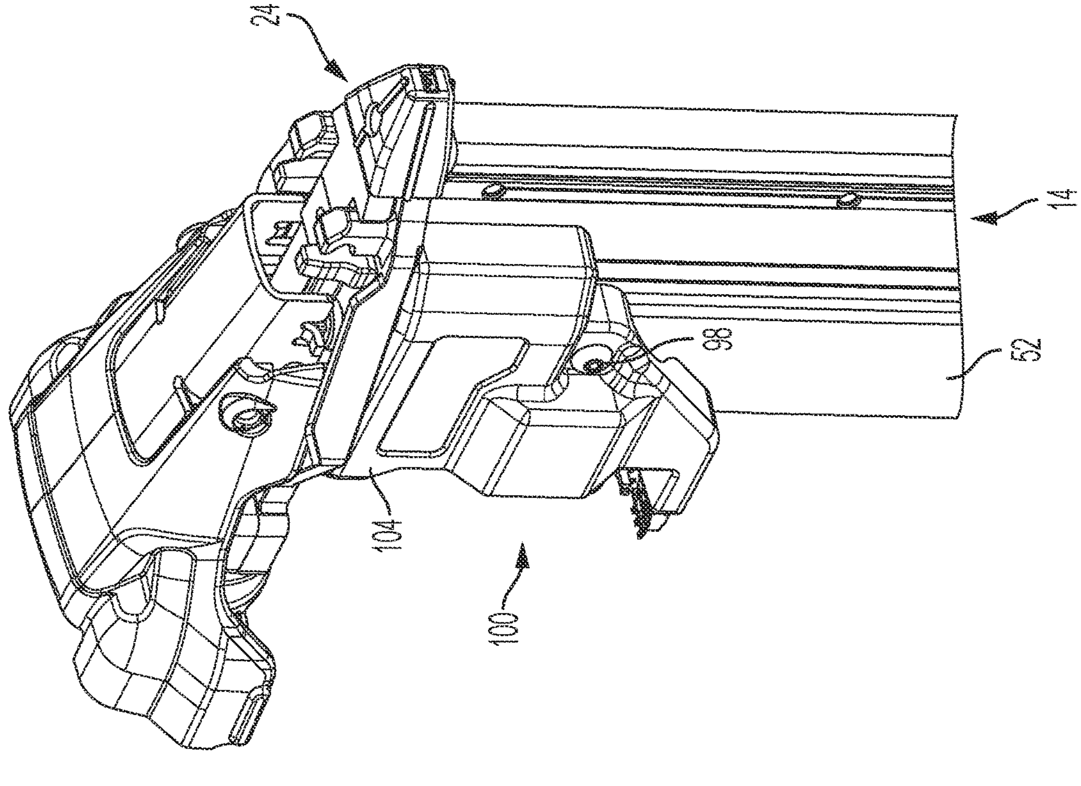

The dry fire lockout assembly 100 can include a member that responds to a condition of fastener quantity in the magazine assembly and a sensing assembly that detects or senses the member response and sends a signal representative of that response to the controller. As shown in FIGS. 3A, 3B and 3C, the dry fire lockout assembly 100 is attached to a side of the magazine assembly 14. In an embodiment the dry fire lockout assembly 100 can be attached to an outer surface of the fixed magazine 52. Alternatively, the dry fire lockout assembly can be attached to other parts of the magazine assembly 14 or the nose portion 68 of the nosepiece assembly 24. In an embodiment, a no-mar tip 70 can be attached to the nose portion 68 of the nosepiece assembly 24 to prevent marring of the workpiece when the nose is placed against the workpiece for driving a fastener.

Figure 4:
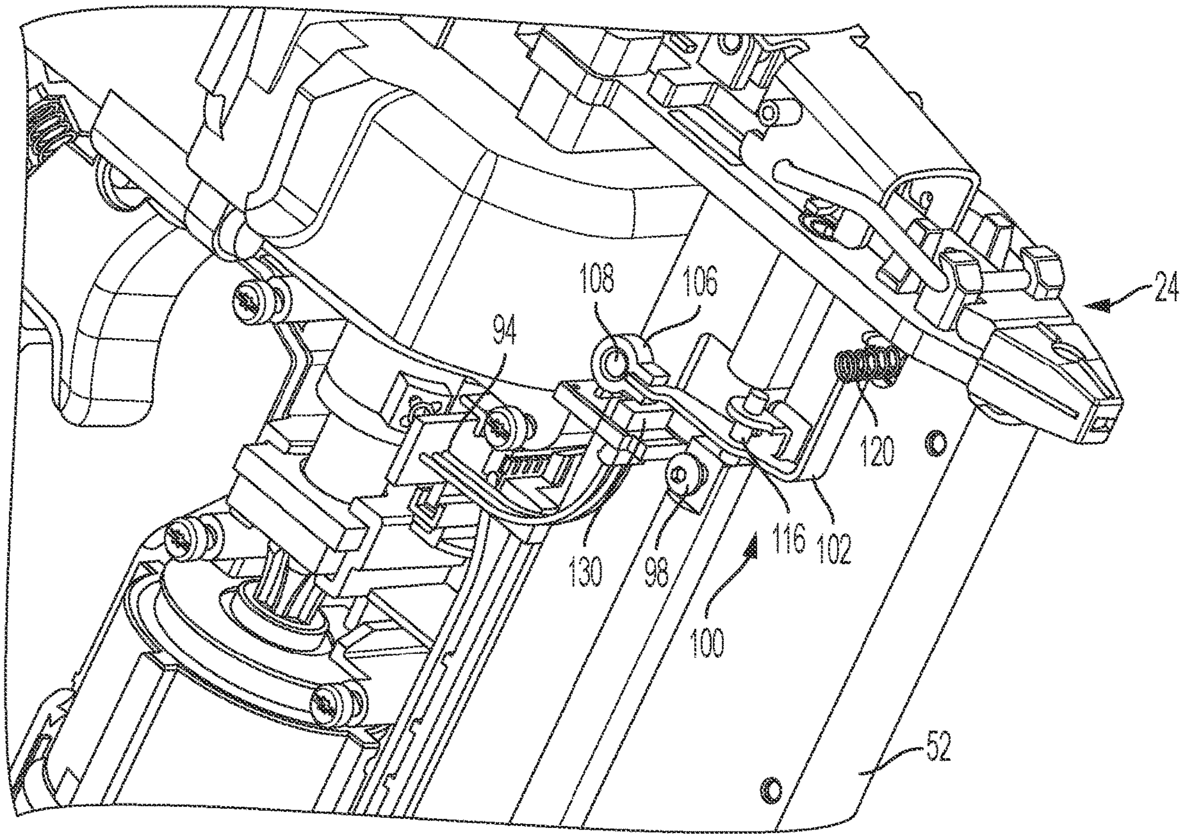
FIG. 4 illustrates the exemplary fastening tool of FIG. 1 with a view of the dry fire lockout assembly as affixed between the magazine and the nosepiece.
Figure 5:
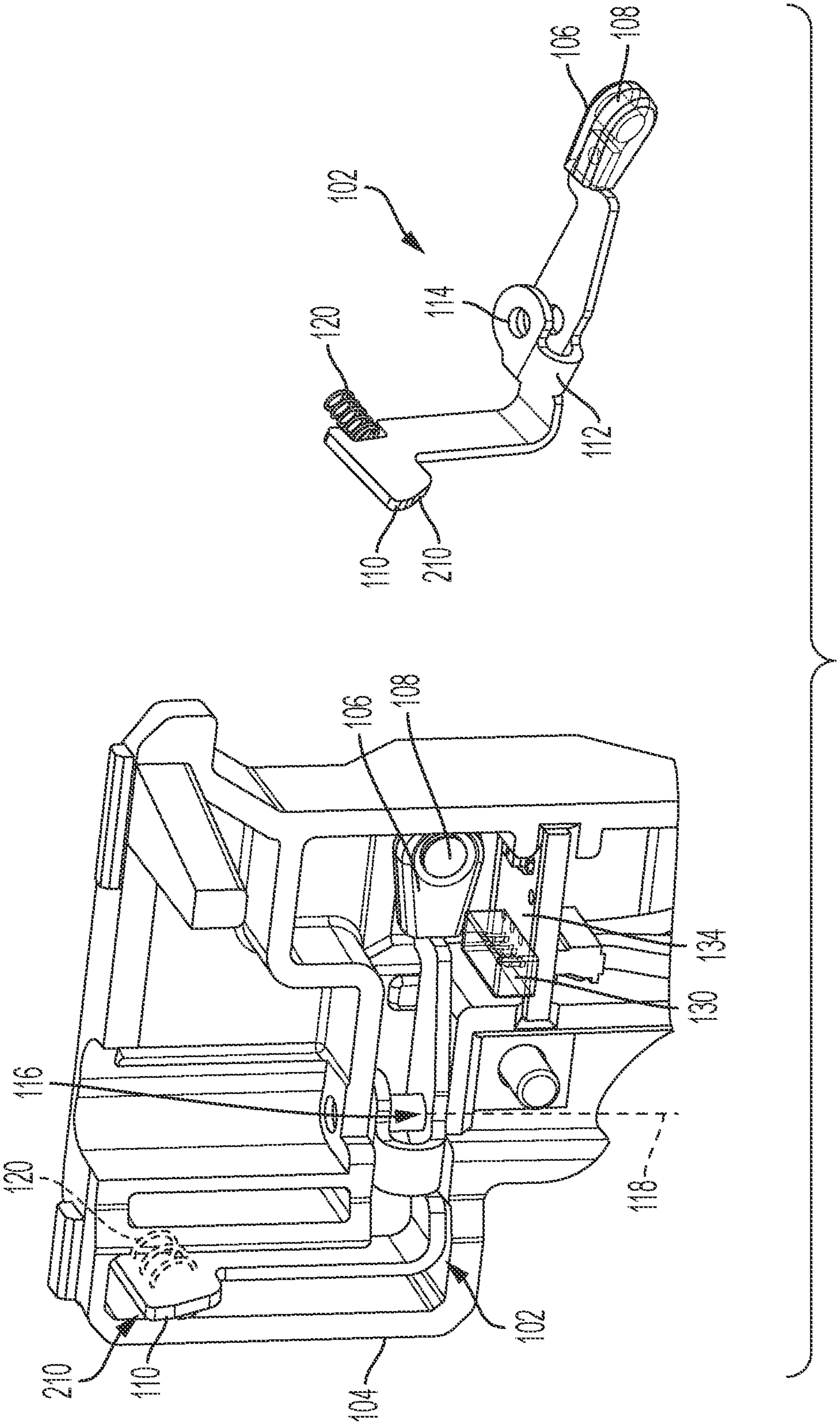
FIG. 5 illustrates the exemplary fastening tool of FIG. 1 having a dry fire lockout assembly within a lockout lever housing.
Figure 6A:
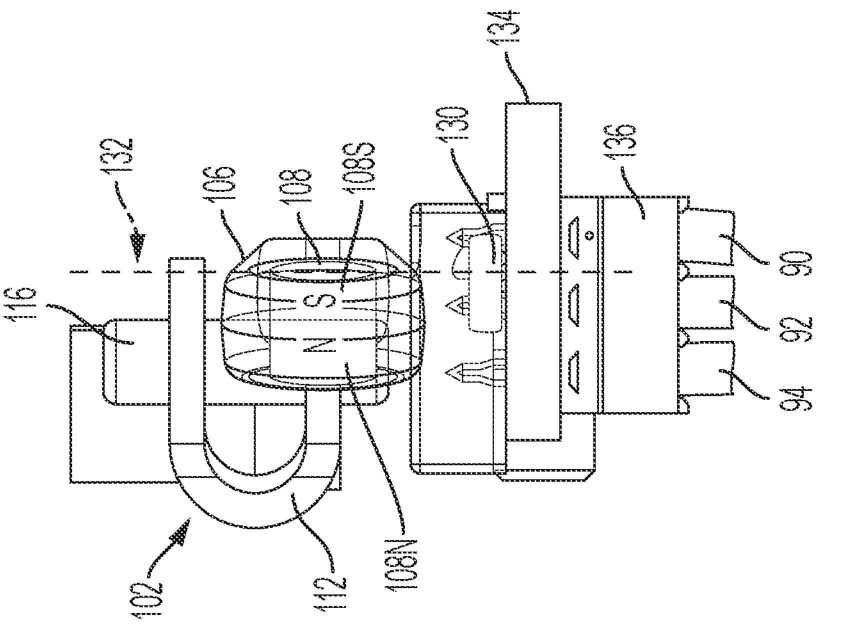
FIGS. 6A and 6B illustrate the exemplary fastening tool of FIG. 1 and the relationship between the Hall effect sensor and the magnet of the dry fire lockout assembly when there is a predetermined number or more of fasteners and less than a predetermined number of fasteners, respectively.
Figure 6B:
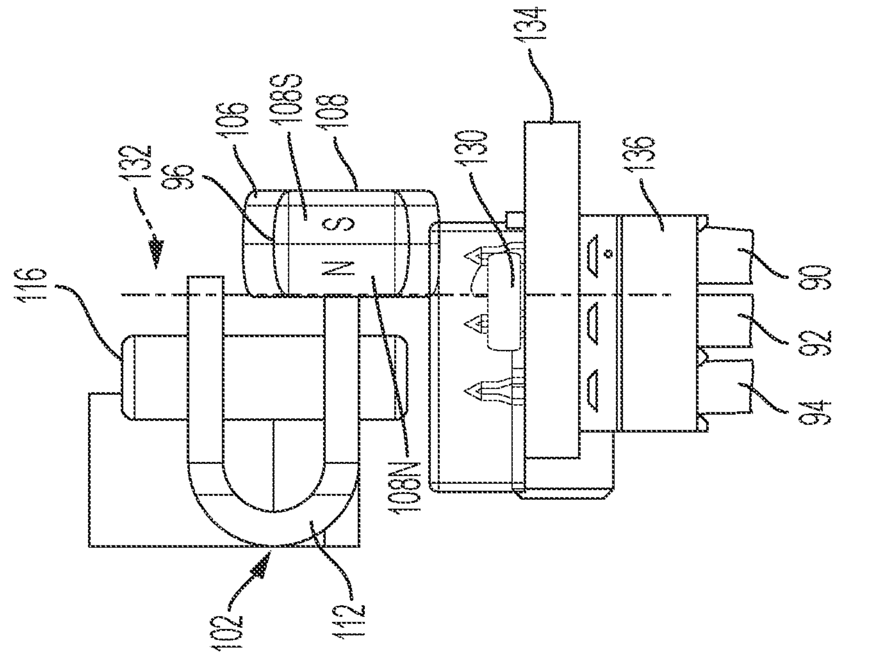

The member that respond to a condition of fastener quantity, as shown in FIGS. 4 and 5, can include a lockout lever 102. The lockout lever 102 can be pivotably mounted on a lockout lever housing 104 and/or disposed within the lockout lever housing. The lockout lever 102 can also be pivotably mounted between the lockout lever housing 104 and the magazine assembly 14.

The lockout lever housing 104 can be formed from a material including, but not limited to plastic. The lockout lever housing can be mounted to the housing 12 and/or affixed to the magazine assembly 14 by a screw 98.

Figure 7B:
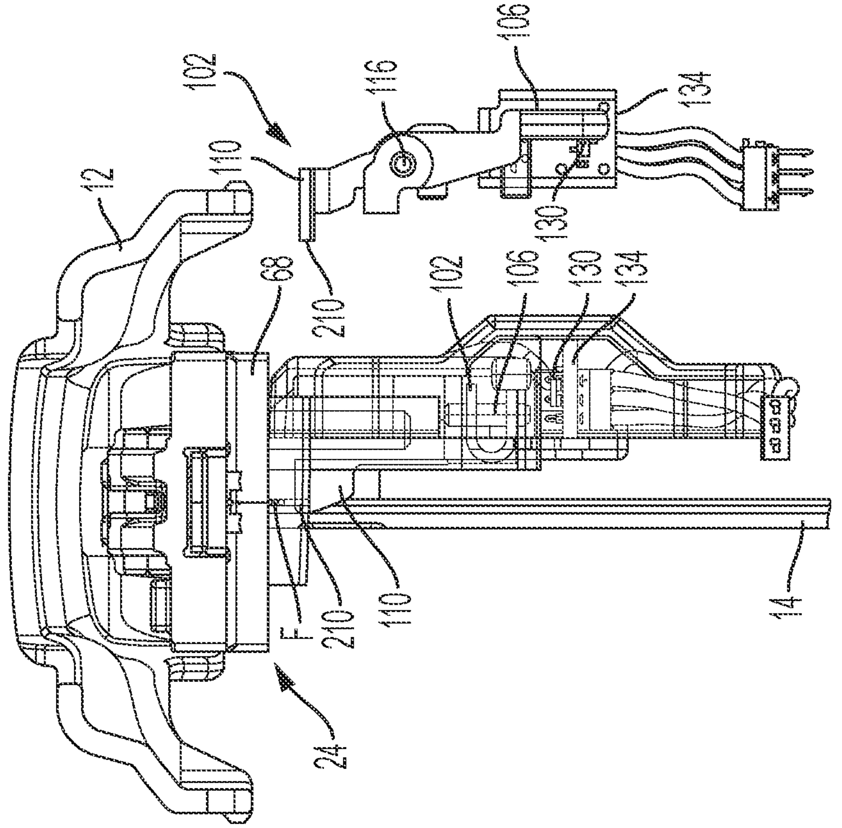
FIGS. 7A and 7B illustrate front views of the exemplary fastening tool of FIG. 1 with the dry fire lockout assembly when there is a predetermined number or more of fasteners and less than a predetermined number of fasteners, respectively.

The lockout lever 102 can be disposed on a side of the magazine assembly 14 so as to engage the magazine assembly when there is less than a predetermined number of fasteners therein. As shown in FIGS. 3C, 4 and 5, the lockout lever 102 has, for example, an L-shaped body defining a first end having a fastener contact portion 110 and a second end, opposite to the first end, defining a head portion 106. The head portion 106 of the lockout lever 102 extends perpendicularly with respect to a fastener contact portion 110 and is coupled to or contains a sensor target or magnet 108. The fastener contact portion 110 has a fastener contact point 210 that engages or contacts the surface of the fasteners, such as along the fastener shank. The lever 102 can be positioned at a location along the fixed magazine 52 to contact a predetermined number of fasteners that are required to prevent a dry fire lockout and be disengaged from the fasteners when the remaining number is or falls below the predetermined number. When the remaining number of fasteners is or falls below the predetermined number, the fastener contact point 210 does not or no longer contacts the surface of the fasteners. As a result, the lever, which is biased toward the fastener channel 64, is configured to pivot as the force exerted by the fasteners on the fastener contact portion 110 of lever is removed. This change in force exerted on fastener contact portion 110 of the lever occurs when the number of fasteners in the magazine assembly changes from a predetermined number to less than a predetermined number. As shown in FIG. 7B, for example, the fastener contact point 210 can be located on a protrusion of the fastener contact portion 110 and is configured to enter the fastener channel 64 in the absence of fasteners.

The lever 102 pivots about a pivot member 116 that is fixed on the lockout housing 104. An intermediate portion of the lever includes an aperture 114 in which the pivot member 116 is disposed. The pivot member 116 defines a pivot axis 118 about which the lockout lever 102 pivots. In an embodiment, the pivot member 116 can be a pin. The lever 102 is configured to pivot about the pivot member 116 in response to a change from a predetermined number of fasteners in the magazine assembly 14 to less than a predetermined number of fasteners in the magazine assembly. An intermediate portion of the lever also includes a rotation support member 112 that reduces play between the lever and the pivot member 116 and increases stability of the lever during rotation.

A biasing member 120, such as a spring, biases the first end or fastener contact portion 110 of the lever 102 in a first direction toward the fastener channel 64 in the magazine assembly 14. Due to the pivot axis being located between the first and second ends of the lever 102, the second end or head portion 106 of the lever 102 is biased away from the fastener channel 64 in a second direction opposite to the first direction.

Figure 7A:
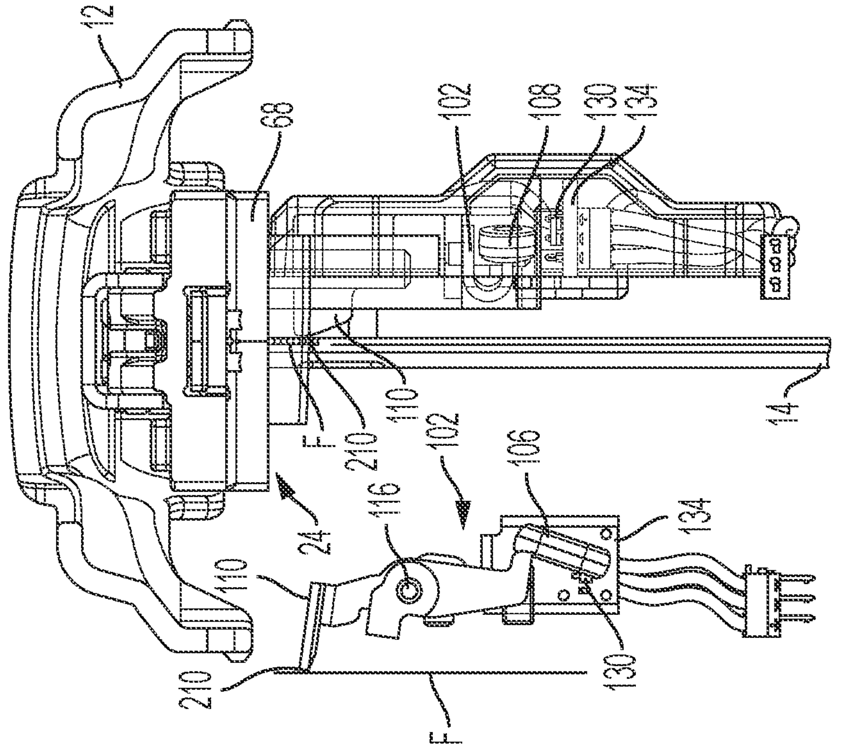
Figure 8B:
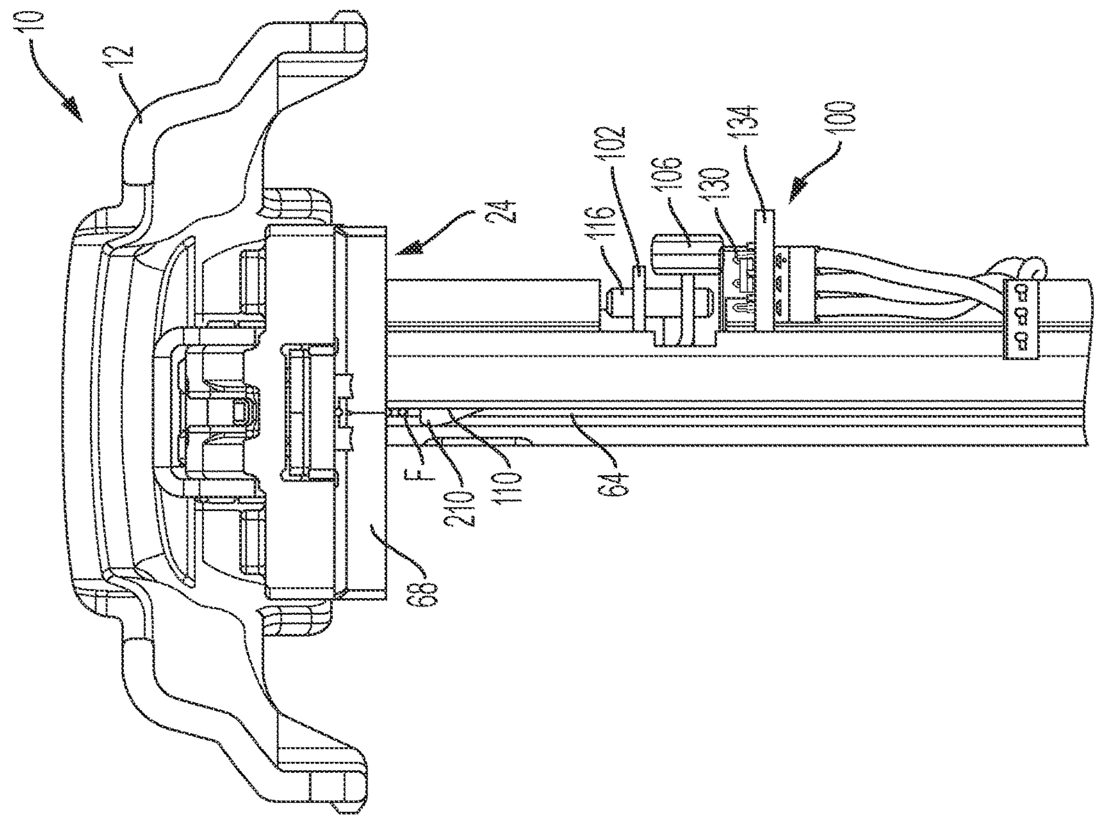
FIGS. 8A and 8B illustrate front views of the exemplary fastening tool of FIG. 1 with and the dry fire lockout assembly in relation to the magazine when there is a predetermined number or more of fasteners and less than a predetermined number of fasteners, respectively.
Figure 8A:
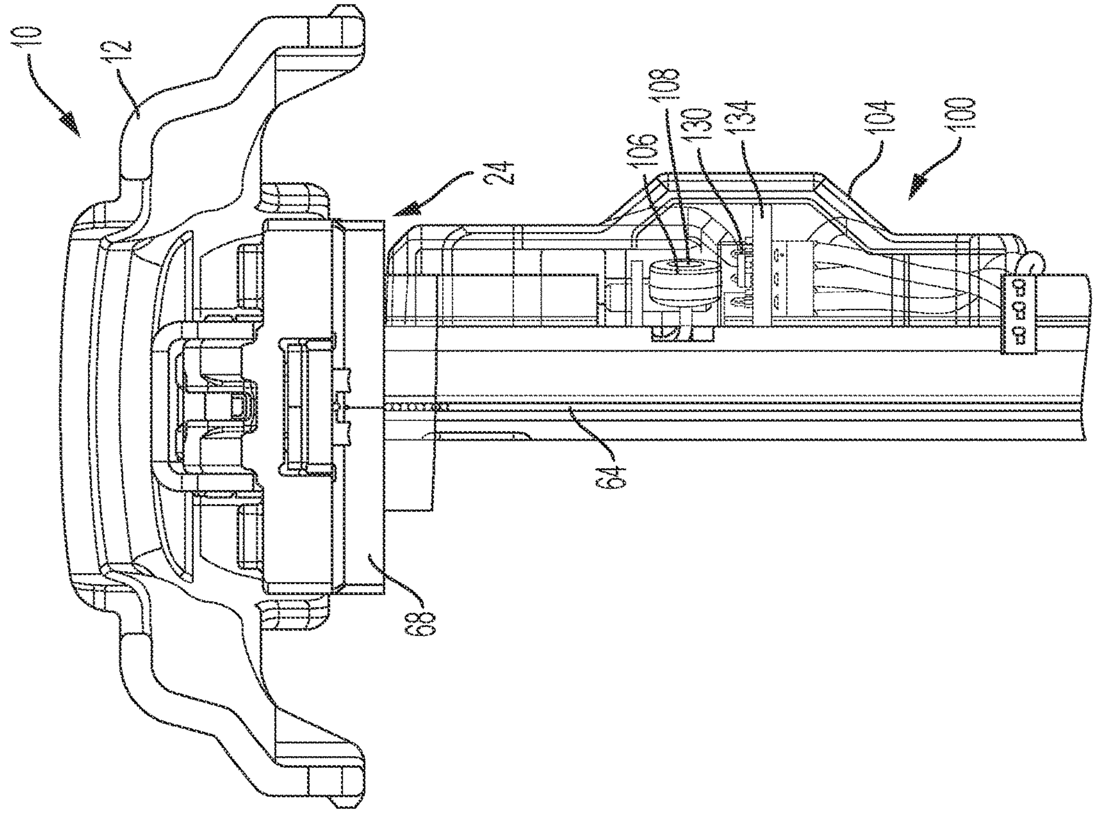

As illustrated in FIG. 5, the biasing member 120 can be arranged between the lever housing 104 and the fastener contact portion 110 to urge the fastener contact portion toward the fastener channel 64. The biasing member 120 biases the lever 102 at the fastener contact portion 110 toward the fastener channel 64 and/or against the predetermined number of fasteners (FIG. 7A). The protrusion on the fastener contact portion 110 will enter the fastener channel 64 when the fasteners are absent from the location where the fastener contact portion engages the magazine assembly 14 (FIG. 7B), such as when less than the predetermined number of fasteners is present in the magazine assembly. In an embodiment, the biasing member 120 can be in the form of a compression spring or a coil spring.

The presence or absence of a predetermined number of fasteners in the magazine assembly is determined by a sensor that senses a characteristic of a sensor target that is engaged with the magazine assembly 14. The sensor has a sensing zone, within which the sensor senses the characteristic of the sensor target relative to the sensing zone. A portion of the sensing zone is identified by reference numeral 132. In this embodiment, a sensor target characteristic can include at least one of a magnetic orientation or a magnetic flux associated with the sensor target. In an embodiment, illustrated in FIGS. 3C, 4, 5, 6A and 6B, the sensor is a Hall effect sensor 130 and the sensor target is a magnet 108.

The Hall effect sensor 130 detects or senses at least one of the magnetic orientation and the magnetic flux of the magnet 108. Since the magnet 108 is coupled for rotation with the pivotable lever 102, the change in position of the magnet results in a change in magnetic orientation or magnetic flux. The Hall effect sensor is configured to send a signal to the controller 16 indicative of at least one of the magnetic orientation and the magnetic flux of the magnet 108. The Hall effect sensor 130 can send or deny an activation signal to the controller 16 to activate and initiate a drive sequence of the fastening tool 10. If the magnetic orientation or the magnetic flux corresponds to less than a predetermined number of fasteners in the magazine assembly, the Hall effect sensor sends a signal through a signal wire 94 to the controller 16 to inhibit a drive sequence.

In an embodiment, the magnet 108 is disposed in the head portion 106 at the second end of the lever 102 and the Hall effect sensor is remote from the lever, and coupled to an inner surface of the lever housing 104. In an embodiment, the Hall effect sensor 130 can be mounted to a circuit board 134 mounted in the lever housing 104. The Hall effect sensor signal through the signal wire 94 is a voltage signal, and the wires 90 and 92 are ground and voltage supply wires, respectively. The wires are connected to the circuit board 134 through a board connector 136. The Hall effect sensor can be a contactless switch such that interfacing with the lever causes the switch to send a signal to the controller 16. It will be appreciated, however, that any type of non-contact sensor, such as an Eddy-current sensor, or a contact-type sensor could be employed.

A Hall effect sensor is a non-limiting example of a magnetometer. A magnetometer can be used to achieve embodiments within the scope disclosed herein. A Hall effect sensor is a type of magnetometer. However, other magnetometers can be used in the disclosed dry fire lockout assembly 100. Additionally, a magnetoresistor or magnetoresistive sensor can be used in the disclosed dry fire lockout assembly 100. Broadly, a sensor that can sense a change in the magnetic field, flux or orientation and has an output that serves as a basis for operation decision can be used in the dry fire lockout assembly 100. Additionally, any sensor that senses a change in characteristic of a sensor target can also be used in the dry fire lockout assembly 100.

There is no restriction as to the type of Hall effect sensor that can be used. Herein, "Hall effect sensor" and "sensor" are used synonymously and interchangeably when referring to a magnetoresistive sensor. Hall effect sensors that can be used include for non-limiting example: a bipolar hall effect sensor, a linear Hall effect sensor, a discrete Hall effect sensor, a magnetoresistive Hall effect sensor. Hall effect sensors that have built-in amplifiers can be used. Hall effect sensors that do not have built-in amplifiers can also be used.

As illustrated in FIGS. 6A, 6B, 7A, 7B, 8A and 8B, the sensor target or magnet 108 is arranged within the sensing zone 132 and remote from the Hall effect sensor 130.

In the embodiment, the magnet 108 can be configured with respect to the Hall effect sensor such that a centerline 96 along a plane between the north pole 108N and the south pole 108S is disposed perpendicular to the Hall effect sensor or perpendicular to a surface of the sensor facing the magnet. The centerline 96 is movable relative to the Hall effect sensor 130 when the lever 102 pivots about the pivot pin 116. In particular, the centerline 96 is movable laterally across the Hall effect sensor 130 so that one of the south pole 108S and the north pole 108N is sensed. Either the south pole or the north pole can define the magnetic orientation or magnetic flux that initiates or inhibits the drive sequence. For example, in an embodiment illustrated in FIGS. 6A and 6B, when the south pole 108S of the magnet 108 is sensed, the controller 16 sends a control signal or activation signal to the motor 44 to activate and initiate a drive sequence. When the magnetic orientation based on the north pole 108N of magnet 108 is sensed, the controller 16 does not send or withholds the control or activation signal to the motor and thereby inhibits the drive sequence. However, either pole can be designated as the pole for which the magnetic orientation is sensed. In an embodiment, the Hall effect sensor also senses the state of the magazine assembly 14 when the tool is at rest. If the magnetic orientation or magnetic flux relative to the sensor corresponds to a state of the magazine assembly having less than a predetermined number of fasteners, then the sensor will send a signal to the controller 16 indicative of the state of the magazine assembly 14 and the controller 16 will inhibit the drive sequence. If the magnetic orientation or magnetic flux relative to the sensor corresponds to a state of the magazine assembly 14 a predetermined number of fasteners, then the sensor will send a signal to the controller 16 indicative of the state of the magazine assembly 14 and the controller will initiate the drive sequence.

Magnets and sensors could be incorporated into the tool at a variety of locations that allow movement of one or more magnets relative to the Hall effect sensor. This disclosure is not limited in regard to a means to place or fix one or more magnets for sensing by the Hall effect sensor. A magnet can be affixed to a member of the tool and/or the tool potting. In an embodiment, plastic can be molded over the magnet.

The magnets can be configured at various distances and in a number of configurations in relation to the Hall effect sensor. One magnet, or a number of magnets can be used to provide input to the Hall effect sensor. Magnets of different strengths and different polarities can be used.

In an embodiment, one or more N35 and/or N35SH magnets can be used. Magnets different from these can be used (e.g. Neodymium Iron Boron magnets). Also, magnetic sources that are not magnets can be used, e.g. magnetized plastics, or magnetically infused plastics (e.g. slider having magnetized portions, magnetized elements, magnetized components, or magnetized plastic portions).

In operation, the user can drive a series of fasteners until a predetermined number of fasteners, or zero fasteners are present in the magazine assembly 14 at which condition, the lockout lever 102 is biased from the surface of the fastener into the fastener channel 64 behind the fasteners F. The lever 102 is biased by contact of the spring against a surface of the fastener contact portion 110 which causes the lever to pivot about the pivot pin 116. The second end of the lever 102 containing the magnet 108 is caused to rotate away from the fastener channel 64 and toward an inner surface of the lockout housing 104. The movement of the magnet 108 is sensed by the Hall effect sensor 130. The Hall effect sensor senses the magnetic orientation or magnetic flux of the magnet indicative of a lockout state and sends a signal to the controller 16. When the controller 16 receives the signal from the Hall effect sensor 130, the controller inhibits the drive sequence. In particular, the controller 16 does not generate an activation or control signal to initiate the drive sequence, thereby preventing a fastener F from being driven. This circumstance can indicate to the user that it is appropriate to add one or more fasteners to the magazine assembly 14.

In an alternate embodiment, instead of the magnet moving relative to the sensor, the sensor can move relative to the magnet. In such an embodiment, the Hall effect sensor can be disposed on the lever and the magnet can be in a fixed position on the lever housing 104 or the magazine assembly 14. In this embodiment, the Hall effect sensor can move with respect to the magnet in order to sense the relative magnetic orientation or relative magnetic flux.

Figure 9:
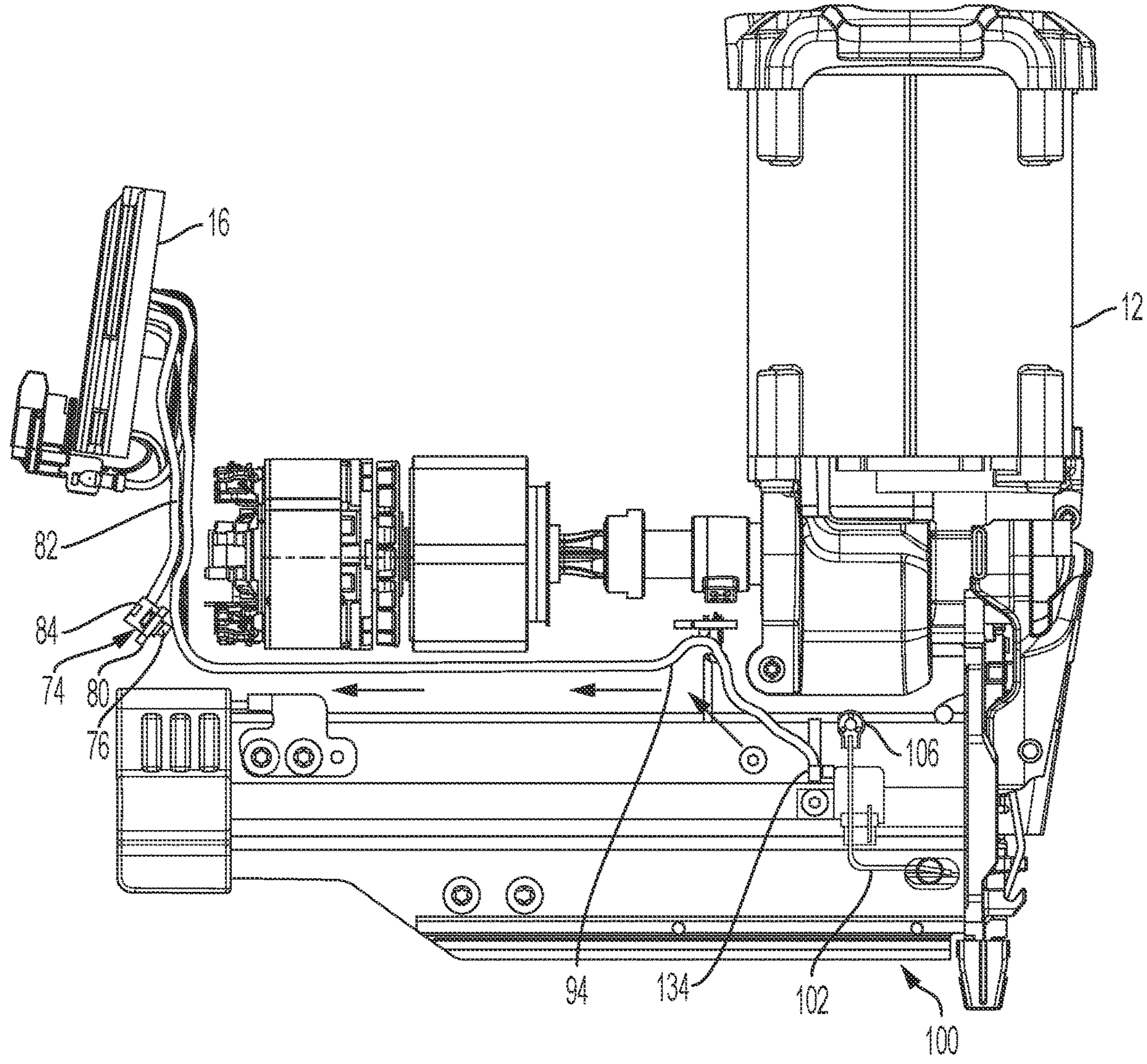
FIG. 9 illustrates the exemplary fastening tool of FIG. 1 with the housing removed and illustrates and indicator light control.

As shown in FIG. 9, the dry fire lockout assembly 100 can further include a dry fire lockout indicator that activates to indicate to the user that additional fasteners must be loaded into the fastening tool 10, for example, into the magazine assembly 14, to resume firing. In operation, the Hall effect sensor 130 detects the magnetic orientation or magnetic flux of the magnet 108 in any portion of the sensing zone 132. The magnetic orientation or magnetic flux sensed relative to the sensor indicates whether the magazine assembly 14 has a predetermined number of fasteners or less than a predetermined of fasteners remaining. If the magnetic orientation or the magnetic flux corresponds to less than a predetermined number of fasteners in the magazine assembly, the Hall effect sensor sends a signal through a signal wire 94 to the controller 16 to inhibit a drive sequence. The controller 16 processes the signal to inhibit the drive sequence thus preventing the fastening tool 10 from firing. The controller 16 will also send a signal, such as through an indicator wire 82, to turn on the indicator. In an embodiment, the indicator can be a light in the form of an LED 84. Activation of the LED 84 visually indicates the dry fire lockout state to the user. The LED 84 can be mounted on an LED circuit board 80 in an illumination section 74 of the tool and the LED circuit board can be disposed in an over-molded section of the housing. The LED light can be visible through a translucent portion, such as a lens 86 of the housing 12, for example.

When more fasteners are loaded into the tool, the Hall effect sensor 130 senses the change in relative magnetic orientation or magnetic flux of the magnet 108 as a force is exerted by the fasteners against the bias of the spring 120 at the fastener contact point 110. The bias against the spring causes the lever to pivot and the coupled or integrated magnet at the second end of the lever to move laterally across the sensing zone 132. The Hall effect sensor thus senses the magnetic orientation or magnetic flux indicative of a predetermined number of fasteners being present in the magazine assembly. The Hall effect sensor 130 then sends a signal through the signal wire 94 to the controller 16 that processes the signal for a normal drive sequence and does not activate the dry fire lockout LED light. In this state, the controller 16 sends the control or activation signal to the primary 32 and secondary 34 triggers to allow the tool to fire.

The dry fire lockout assembly 100, when activated, provides a visual indicator to the user that there are not enough fasteners in the magazine to commence a drive sequence to drive a fastener into the workpiece W. In an embodiment, the visual indicator is an LED light 84 that is disposed in an illumination portion 74 of the housing. The LED light is disposed on one side of the LED circuit board 80 and receives an indicator activation signal from the controller 16 through an indicator wire 82 to activate. The LED light 84 will activate each time the user pulls the triggers 32, 34 in the trigger assembly 28, and deactivate when the user releases the triggers, until a predetermined number of fasteners at or above a threshold amount for operation is provided in the magazine assembly 14. An opposite side of the LED circuit board contains a workpiece illumination LED 76 that can have a clear lens 78 for allowing light to project on and about the workpiece W.

The dry fire lockout lens or the dry fire lockout LED can have a color different from the color of the workpiece illumination lens or workpiece illumination LED in order to distinguish the lights. In an embodiment, the dry fire lockout LED can have a color such as, for example a primary color, such as red, yellow, that makes the user aware that a fastener is not going to be driven and that it is appropriate to reload fasteners or to add more fasteners into the magazine assembly 14. Similarly, in an embodiment the indicator can be an audible or vibratory indicator that makes the user aware that a fastener is not going to be driven and that it is appropriate to reload fasteners or to add more fasteners into the tool or the magazine assembly.

As a result of the claimed lever-activated dry fire lockout assembly, the fastening tool uses the high reliability of a Hall sensor switch while also isolating the magnet from the drive and fastener feed system to reduce the chance of contamination. By having the magnetic field oriented perpendicular to the sensor, the resolution of the system is much more consistent and resilient to slight dimensional inaccuracies.

While aspects of the present invention are described herein and illustrated in the accompanying drawings in the context of a fastening tool, those of ordinary skill in the art will appreciate that the invention, in its broadest aspects, has further applicability.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A fastening tool comprising:

a housing;

a nosepiece assembly connected to the housing and including a fastener drive track having a drive axis;

a magazine assembly including a magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive sequence;

a lever having a first end and a second end longitudinally opposite to the first end, the lever configured to pivot in response to a change in force applied to the first end thereof;

a sensor target disposed on the second end of the lever and having a characteristic that changes in response to the change in force; and a sensor configured to sense a characteristic of the sensor target and send a signal to the controller in response to the characteristic, wherein when the controller receives the signal from the sensor, the controller inhibits the drive sequence, and wherein when there is less than a predetermined number of fasteners in the magazine assembly, the first end of the lever is configured to enter the fastener channel.

2. The fastening tool according to claim 1, wherein the change in force comprises a state where the number of fasteners in the magazine assembly changes from a predetermined number to less than a predetermined number.

3. The fastening tool according to claim 1, wherein the first end of the lever is biased toward the fastener channel and the second end of the lever is biased away from the fastener channel.

4. The fastening tool according to claim 3, wherein a spring biases the first end of the lever against the fasteners in the fastener channel whereby a portion of the lever will enter the fastener channel when less than a predetermined number of fasteners are present in the magazine.

5. The fastening tool according to claim 3, wherein the lever is spring-biased by a compression spring.

6. The fastening tool according to claim 1, wherein the sensor has a sensing zone and the sensor target has at least one of a magnetic orientation and a magnetic flux, and wherein the sensor senses the magnetic orientation or the magnetic flux of the sensor target relative to the sensing zone.

7. The fastening tool of claim 6, wherein the sensor is configured to send a signal to the controller indicative of at least one of the magnetic orientation and the magnetic flux of the sensor target.

8. The fastening tool according to claim 1, wherein the sensor comprises a contactless switch.

9. The fastening tool according to claim 1, wherein the characteristic of the sensor target is at least one of a magnetic orientation and a magnetic flux.

10. The fastening tool according to claim 1, wherein the sensor comprises a Hall effect sensor and the sensor target comprises a magnet, and wherein the characteristic of the sensor target is at least one of a magnetic orientation and a magnetic flux.

11. The fastening tool according to claim 10, wherein the magnet has a centerline along a plane between poles that is perpendicular to the Hall effect sensor.

12. The fastening tool according to claim 11, wherein pivoting of the lever and movement of the centerline across the Hall effect sensor corresponds to a change in at least one of relative magnetic orientation and relative magnetic flux sensed by the Hall effect sensor.

13. A fastening tool comprising:

a housing;

a nosepiece assembly connected to the housing and including a fastener drive track having a drive axis;

a magazine assembly including at least one magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive sequence;

a lever housing mounted to the magazine assembly;

a lockout lever pivotably mounted on the lever housing and having a first end configured to enter the fastener channel when there is less than a predetermined number of fasteners in the magazine assembly and a second end that moves in a direction opposite to the first end when the first end enters the fastener channel;

a magnet disposed on the second end of the lever and having at least one of a magnetic orientation and a magnetic flux that corresponds to a state of the magazine assembly having less than a predetermined number of fasteners; and a Hall effect sensor configured to sense at least one of the magnetic orientation and the magnetic flux of the magnet and send a signal to the controller in response to the magnetic orientation or the magnetic flux, wherein when the controller receives the signal from the Hall effect sensor that indicates that there is less than a predetermined number of fasteners, the controller inhibits the drive sequence.

14. The fastening tool according to claim 13, wherein the first end of the lever includes a fastener contact portion having a protrusion that enters the fastener channel when there is less than a predetermined number of fasteners in the magazine assembly.

15. The fastening tool according to claim 13, further comprising a biasing member that biases the lever at the fastener contact portion toward the fastener channel.

16. The fastening tool according to claim 15, wherein the biasing member is disposed between the lever housing and the fastener contact portion of the lever.

17. The fastening tool according to claim 15, wherein the biasing member comprises a compression spring.

18. The fastening tool according to claim 13, wherein the magnet has a centerline along a plane between poles that is perpendicular to the Hall effect sensor, the Hall effect sensor defining a sensing zone.

19. The fastening tool according to claim 18, wherein the Hall effect sensor is configured to sense a change in the at least one of the magnetic orientation and magnetic flux in the sensing zone when the lever pivots, causing the centerline of the magnet at the second end thereof moves across the sensing zone.

20. The fastening tool according to claim 18, wherein the Hall effect sensor is configured to sense at least one of the magnetic orientation and magnetic flux in the sensing zone when the lever pivots to advance the first end thereof into the fastener channel and the centerline of the magnet at the second end thereof moves across the sensing zone.

21. The fastening tool according to claim 18, wherein the lever is pivotable about a pivot pin having an axis parallel to the centerline of the magnet.

22. The fastening tool according to claim 13, wherein the lever is configured to pivot about a pivot member disposed between the first end and the second end.

23. A fastening tool comprising:

a housing;

a nosepiece assembly connected to the housing and including a fastener drive track having a drive axis;

a magazine assembly including a magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive sequence;

a lever having a first end and a second end opposite to the first end, the first end of the lever disposed in the fastener channel when there is less than a predetermined number of fasteners in the magazine assembly;

a sensor target disposed on the second end of the lever; and a sensor having a sensing zone, the sensor configured to sense a characteristic of the sensor target within the sensing zone, that indicates that there is less than a predetermined number of fasteners in the magazine assembly and send a signal to the controller in response to the characteristic, wherein when the controller receives the signal from the sensor, the controller inhibits the drive sequence, and wherein when there is a predetermined number of fasteners in the magazine assembly, the sensor target is outside of the sensing zone and when there is less than a predetermined number of fasteners in the magazine assembly, the sensor target is inside the sensing zone.

24. The fastening tool according to claim 23, wherein the sensor senses is at least one of a magnetic orientation and a magnetic flux of the sensor target to determine that the first end of the lever is in the fastener channel.

25. The fastening tool according to claim 23, wherein the sensor senses at least one of a magnetic orientation and a magnetic flux of the sensor target within the sensing zone and sends a signal to the controller when the sensor senses a predetermined magnetic orientation or the magnetic flux.

26. The fastening tool according to claim 23, wherein the sensor comprises a Hall effect sensor and the sensor target comprises a magnet.

27. A fastening tool comprising:

a housing;

a nosepiece assembly connected to the housing and including a fastener drive track having a drive axis;

a magazine assembly including a magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive sequence;

a lever having a first end and a second end longitudinally opposite to the first end, the lever configured to pivot in response to a change in force applied to the first end thereof;

a sensor target disposed on the second end of the lever and having a characteristic that changes in response to the change in force;

a sensor configured to sense the characteristic of the sensor target and send a signal to the controller in response to the characteristic; and an indicator operatively connected to the controller to receive an activation signal therefrom, wherein when the controller receives the signal from the sensor, the controller inhibits the drive sequence and initiates activation of the indicator, and wherein when there is less than a predetermined number of fasteners in the magazine assembly, the first end of the lever is configured to enter the fastener channel.

28. The fastening tool according to claim 27, wherein the indicator comprises at least one visual indicator that is activated by the controller when there is less than a predetermined number of fasteners in the magazine assembly.

29. The fastening tool according to claim 27, wherein the at least one visual indicator is activated by the controller when the sensor detects that there is less than a predetermined number of fasteners the magazine assembly.

30. The fastening tool according to claim 27, wherein the at least one visual indicator is activated by the controller when the sensor detects that there are no fasteners the magazine assembly.

31. The fastening tool according to claim 27, wherein the characteristic of the sensor target is at least one of a magnetic orientation and a magnetic flux.

32. A fastening tool comprising:

a housing;

a nosepiece assembly connected to the housing and including a fastener drive track having a drive axis;

a magazine assembly including a magazine pusher slidably disposed in the magazine assembly for feeding a number of fasteners successively along a fastener channel to the fastener drive track of the nosepiece assembly;

a driver member provided in the housing and configured for movement along the drive axis to drive a lead fastener into a workpiece;

a motor disposed within the housing and configured to drive the driver member along the drive axis;

a power source providing power to the motor;

a controller configured to control a supply of power from the power source to the motor and initiate a drive sequence;

a lever having a first end and a second end opposite to the first end, the first end of the lever disposed in the fastener channel when there is less than a predetermined number of fasteners in the magazine assembly;

a sensor target disposed on the second end of the lever;

a sensor having a sensing zone, the sensor configured to sense a characteristic of the sensor target within the sensing zone, that indicates that there is less than a predetermined number of fasteners in the magazine assembly and send an output signal to the controller in response to the characteristic, and at least one visual indicator operatively connected to the controller to receive an indicator activation signal therefrom, wherein when the controller receives the output signal from the sensor, the controller inhibits the drive sequence, wherein the at least one visual indicator is activated by the controller when the sensor detects the characteristic of the sensor target that corresponds to a state of the magazine assembly having less than a predetermined number of fasteners, and wherein when there is a predetermined number of fasteners in the magazine assembly, the sensor target is outside of the sensing zone and when there is less than a predetermined number of fasteners in the magazine assembly, the sensor target is inside the sensing zone.

33. A lockout assembly in a fastening tool having a magazine assembly including at least one magazine pusher slidably disposed in the magazine assembly for feeding a number of fasteners successively along a fastener channel, a power source, and a controller configured to control a supply of power and initiate a drive sequence, the lockout assembly comprising:

a pivotable lever engageable with the fastener channel and having a first end configured to enter the fastener channel when there is less than a predetermined number of fasteners in the magazine assembly and a second end that moves in a direction opposite to the first end when the first end enters the fastener channel;

a magnet disposed on the second end of the pivotable lever and having at least one of a magnetic orientation and a magnetic flux that corresponds to a state of the magazine assembly having less than a predetermined number of fasteners; and a Hall effect sensor configured to sense at least one of the magnetic orientation and the magnetic flux of the magnet and send a signal to the controller in response to the magnetic orientation or the magnetic flux, wherein when the controller receives the signal from the Hall effect sensor that indicates that there is less than a predetermined number of fasteners, the controller inhibits the drive sequence.

* * * * *